(12) United States Patent
Kwon et al.

(10) Patent No.: US 7,831,226 B2
(45) Date of Patent: Nov. 9, 2010

(54) IMPEDANCE MATCHING SYSTEM, NETWORK ANALYZER HAVING THE SAME, AND IMPEDANCE MATCHING METHOD THEREOF

(75) Inventors: Do-Hoon Kwon, Seoul (KR); Young-eil Kim, Suwon-si (KR)

(73) Assignees: Samsung Electronics Co., Ltd., Suwon-Si (KR); Samsung Electro-Mechanics Co., Ltd., Suwon Si (KR)

( * ) Notice: Subject to any disclaimer, the term of this patent is extended or adjusted under 35 U.S.C. 154(b) by 654 days.

(21) Appl. No.: 11/644,979

(22) Filed: Dec. 26, 2006

(65) Prior Publication Data

US 2007/0232249 A1    Oct. 4, 2007

(30) Foreign Application Priority Data

Apr. 4, 2006    (KR) ...................... 10-2006-0030561

(51) Int. Cl.
  *H04B 1/18* (2006.01)
  *H01Q 11/12* (2006.01)
  *H01P 5/08* (2006.01)

(52) U.S. Cl. .................... 455/121; 455/123; 455/193.1; 455/280; 455/289; 333/17.3; 333/1

(58) Field of Classification Search ................. 455/121, 455/123, 193.1, 196.1, 286, 287, 280; 333/17.1, 333/17.3

See application file for complete search history.

(56) References Cited

U.S. PATENT DOCUMENTS 3,900,823 A      8/1975   Sokal et al.
4,015,223 A *    3/1977   Cheze ........................ 333/17.3

(Continued)

FOREIGN PATENT DOCUMENTS

EP           1 513 276 A2    3/2005

(Continued)

OTHER PUBLICATIONS

Korean Patent Office Action, Mailed May 31, 2007 and issued in corresponding Korean Patent Application No. 10-2006-0030561.

(Continued)

*Primary Examiner*—Duc M Nguyen
(74) *Attorney, Agent, or Firm*—Staas & Halsey LLP

(57) ABSTRACT

An impedance matching system, a network analyzer having the same, and an impedance matching method thereof are disclosed. The system includes a signal extractor to extract an output signal and an input signal having at least a portion of an electric current outputted through a load and at least a portion of an electric current inputted through the load, respectively, a processor to process the output signal and the input signal extracted from the signal extractor, a comparator to compare a phase and an amplitude of the output signal with a phase and an amplitude of the input signal, respectively, a coefficient calculator to calculate a reflection coefficient using the comparative result provided from the comparator, and a circuit controller to generate a signal for controlling a matching circuit, which matches the phase and the amplitude of the output signal with the phase and the amplitude of the input signal, respectively, so as to ensure the reflection coefficient to have a predetermined value.

30 Claims, 4 Drawing Sheets

U.S. PATENT DOCUMENTS

| | | | | |
|---|---|---|---|---|
| 4,493,112 | A | * | 1/1985 | Bruene .................... 455/123 |
| 4,621,242 | A | * | 11/1986 | Theall et al. ............... 333/17.3 |
| 5,420,552 | A | * | 5/1995 | Sakka ...................... 333/17.1 |
| 5,564,086 | A | * | 10/1996 | Cygan et al. ............... 455/126 |
| 5,629,653 | A | * | 5/1997 | Stimson .................... 333/17.3 |
| 5,757,247 | A | * | 5/1998 | Koukkari et al. ............ 333/17.1 |
| 5,778,308 | A | * | 7/1998 | Sroka et al. ............... 455/115.1 |
| 6,178,310 | B1 | | 1/2001 | Jeong |
| 6,414,562 | B1 | | 7/2002 | Bouisse et al. |
| 6,545,559 | B2 | * | 4/2003 | Cullbom et al. ............ 333/17.1 |
| 2007/0197180 | A1 | * | 8/2007 | McKinzie et al. ........ 455/248.1 |

FOREIGN PATENT DOCUMENTS

| | | |
|---|---|---|
| JP | 4-357471 | 12/1992 |
| JP | 8-97733 | 4/1996 |
| JP | 8-505495 | 6/1996 |
| JP | 2001-16044 | 1/2001 |

OTHER PUBLICATIONS

Japanese Office Action issued Mar. 2, 2010 in corresponding Japanese Patent Application 2007-098757.

European Search Report dated Mar. 23, 2010 and issued in corresponding European Patent Application 07104521.5.

* cited by examiner

IMPEDANCE MATCHING SYSTEM, NETWORK ANALYZER HAVING THE SAME, AND IMPEDANCE MATCHING METHOD THEREOF

CROSS-REFERENCE TO RELATED APPLICATION

This application claims the benefit under 35 U.S.C. §119 (a) of Korean Patent Application No. 10-2006-030561, filed Apr. 4, 2006, in the Korean Intellectual Property Office, the entire disclosure of which is incorporated herein by reference.

BACKGROUND OF THE INVENTION

1. Field of the Invention

The present invention relates generally to an impedance matching system, a network analyzer having the same, and an impedance matching method thereof. More particularly, the present invention relates to an impedance matching system capable of more quickly and accurately matching an impedance of a load, a network analyzer having the same, and an impedance matching method thereof.

2. Description of the Related Art

Generally, in a load, such as an antenna, a value of load impedance for optimizing an output of the load is set up in advance. Generally, antennas are set up to have an impedance of 50Ω.

Accordingly, in order to maintain a performance of the load in an optimum condition, it is important for the impedance to be always maintained in the value set up in advance. However, the value of the impedance can be easily changed by an external environment, a linearity, etc. For instance, if a temperature or humidity is too high or low, and if there is a metal substance around the antenna, the value of the impedance is changed.

If the value of the impedance is changed as described above, during transmission of radio frequency (RF) signals, an electric power efficiency of RF signals, which are outputted through the antenna, is lowered. As a result, a portion of the RF signals to be transmitted is reflected from an input end side of the antenna to flow in a reverse direction, and is inputted into a transmitting circuit. Also, during reception of RF signals, an electric power efficiency of RF signals, which are received through the antenna, is lowered. As a result, RF signals are not received well, and the received RF signals flow in a reverse direction to be outputted through the antenna.

During the transmission and the reception of the RF signals, a phase difference and an amplitude ratio of the signals reflected from the antenna to the RF signals outputted through the antenna can be represented as a reflection coefficient. The reflection coefficient represents a degree in change of the impedance and a degree in performance deterioration of the antenna. The reflection coefficient comes to 0 in an ideal condition, that is, when there is no signal reflected into the transmitting circuit during the transmission of the RF signals and there is no signal outputted through the antenna during the reception of the RF signals. Accordingly, the reflection coefficient can be used as a standard of determining the impedance.

When the value of the impedance is changed as described above, to again match the impedance to 50Ω, there have been used various methods. Among the various methods, a method of matching the impedance using a matching circuit is mainly used.

Generally, the matching circuit is made up of elements including an inductor, a capacitor (or a condenser), etc. The capacitor is formed of a varactor in which a capacitance is varied according to a voltage. Accordingly, if a voltage, which is applied to the matching circuit, is varied, an inductance of the inductor and a capacitance of the condenser are varied, thereby enabling the impedance to be changed.

In case of using such a matching circuit, to accurately determine the voltage to be applied to the matching circuit is the key to accurately match the impedance. To determine the voltage, various methods are used.

In recent, with a minimization of a mobile phone, a size of the antenna is minimized, and/or the antenna is even built-in. However, the smaller the size of the antenna is, the more the matching of impedance is difficult in fabrication and is affected by the environment than in a normal size antenna in operation. Accordingly, if the conventional voltage determining method is used to a small size antenna, it is not only difficult to sufficiently and accurately match the impedance, but also necessary to repeat the impedance matching procedure several times to match the impedance. Thus, there is required a new method capable of more quickly and accurately carrying out the matching of impedance.

SUMMARY OF THE INVENTION

Additional aspects and/or advantages of the invention will be set forth in part in the description which follows and, in part, will be apparent from the description, or may be learned by practice of the invention.

Accordingly, an aspect of the present invention is to provide an impedance matching system capable of more quickly and accurately matching an impedance of a load, a network analyzer having the same, and an impedance matching method thereof.

According to an aspect of an exemplary embodiment of the present invention, an impedance matching system includes a signal extractor to produce an output signal and an input signal having at least a portion of an electric current outputted through a load and at least a portion of an electric current inputted through the load, respectively, a comparator to compare a phase and an amplitude of the output signal with a phase and an amplitude of the input signal, respectively, a coefficient calculator to calculate a reflection coefficient using the comparative result provided from the comparator, and a circuit controller to generate a signal for controlling a matching circuit, which matches the phase and the amplitude of the output signal with the phase and the amplitude of the input signal, respectively, so as to ensure the reflection coefficient to have a predetermined value.

The signal extractor may be a directional coupler to produce an output signal extracting an electric current outputted through the load with a predetermined ratio and to produce an input signal extracting an electric current reflected from the load with a predetermined ratio, during an operation of a transmitting circuit.

The signal extractor may be a directional coupler to produce an input signal extracting an electric current inputted through the load with a predetermined ratio and to produce an output signal extracting an electric current reflected from a receiving circuit with a predetermined rateratio, during an operation of the receiving circuit.

The system may further include a pair of mixers to mix the output and the input signals with a predetermined frequency, respectively, and thus to lower frequencies of the output and the input signals to a predetermined frequency band.

The system may further include a local oscillator to generate a component of frequency different by the predetermined frequency band as compared with a base band frequency and to provide the component of frequency to the mixers.

The system may further include a pair of filters to filter the output and the input signals.

Each of the filters may include a band pass filter (BPF) to filter signals centering on a predetermined frequency band.

Each of the filters may include a low pass filter (LPF) to filter signals of above a predetermined frequency band.

The system may further include a pair of amplifiers to amplify the output and the input signals.

Each of the amplifiers may be a variable gain amplifier (VGA), which is able to adjust an amplification gain of the output and the input signals. The amplifiers may amplify the output and the input signals with the same gain.

The system may further include a pair of A/D converters to convert the output and the input signals into digital signals.

The system may further include a pair of band pass filters (BPF) to filter the output and the input signals, which are filtered at low pass filters (LPF) and then converted into the digital signals at the A/D converters, respectively, on the basis of a predetermined band.

The comparator may include an amplitude comparing unit to compare amplitude of digitized output signal with amplitude of digitized input signal and to calculate amplitudes of the output and the input signals, respectively a processor to process the output signal and the input signal extracted from the signal extractor.

The comparator may include a phase comparing unit to compare a phase of digitized output signal with a phase of digitized input signal and to calculate a phase difference between the output signal and the input signal.

The circuit controller may determine a value of voltage applied to variable elements among elements forming the matching circuit, according to the reflection coefficient calculated at the coefficient calculator.

The circuit controller may determine the value of voltage, so that the load has an impedance of 50Ω by the matching circuit.

According to another aspect of an exemplary embodiment of the present invention, a network analyzer includes a signal extractor to produce an output signal and an input signal extracting at least a portion of an electric current outputted through a load and at least a portion of an electric current inputted through the load, respectively, a comparator to compare a phase and an amplitude of the output signal with a phase and an amplitude of the input signal, respectively, and a coefficient calculator to calculate a reflection coefficient using the comparative result provided from the comparator.

According to still another aspect of an exemplary embodiment of the present invention, an impedance matching method includes producing an output signal and an input signal extracting at least a portion of an electric current outputted through a load and at least a portion of an electric current inputted through the load, respectively, comparing a phase and an amplitude of the output signal with a phase and an amplitude of the input signal, respectively, calculating a reflection coefficient using the compared result, and determining a value of voltage for providing to a matching circuit so as to ensure the reflection coefficient to have a predetermined value.

BRIEF DESCRIPTION OF THE DRAWINGS

These and/or other aspects and advantages of the invention will become apparent and more readily appreciated from the following description of the embodiments, taken in conjunction with the accompanying drawings of which.

Throughout the drawings, the same drawing reference numerals will be understood to refer to the same elements, features, and structures.

DETAILED DESCRIPTION OF THE PREFERRED EMBODIMENTS

Figure 1:
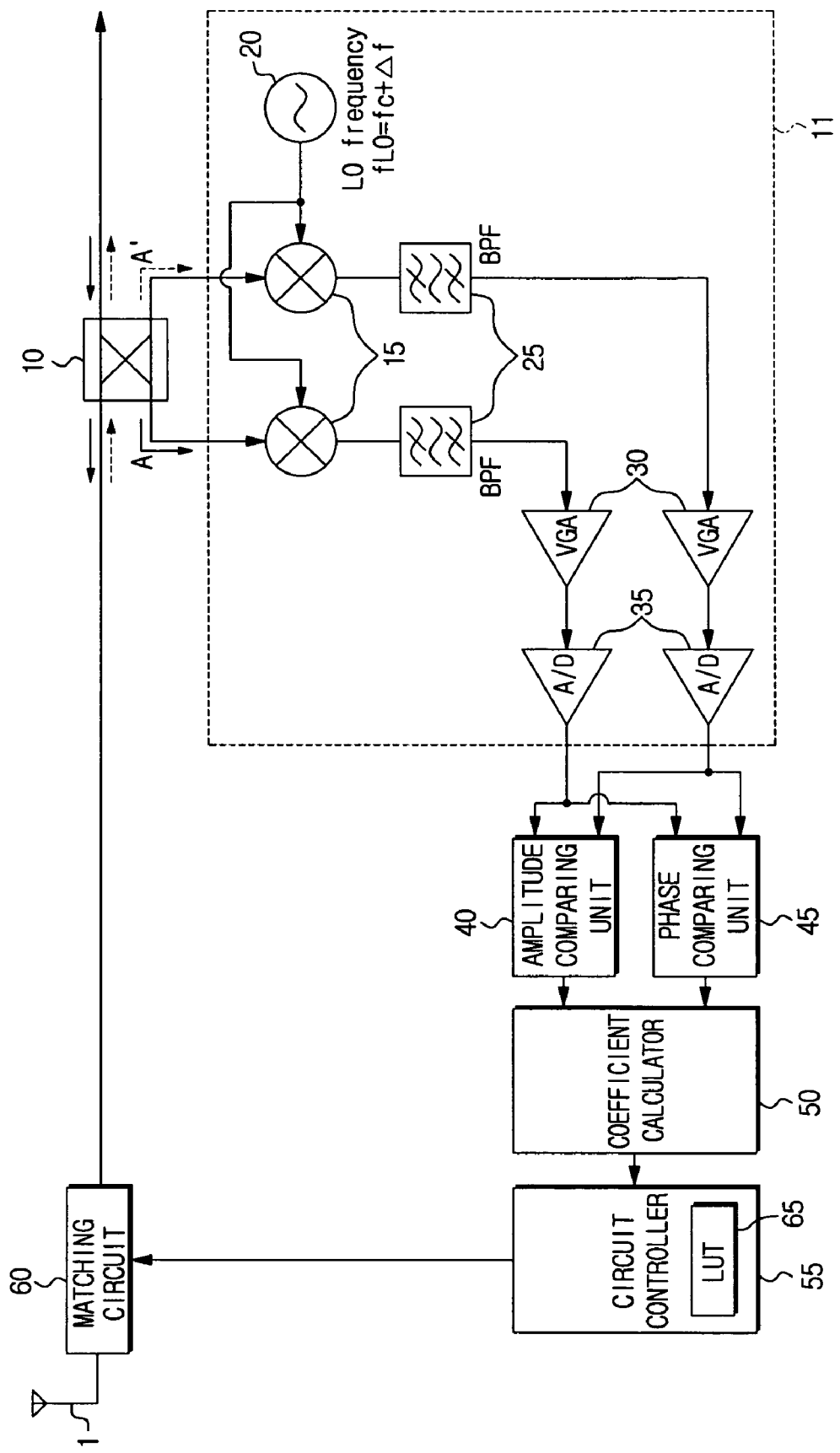
FIG. 1 is a construction view exemplifying an impedance matching system according to an exemplary embodiment of the present invention, which is applied to an antenna.

Reference will now be made in detail to the embodiments of the present invention, examples of which are illustrated in the accompanying drawings, wherein like reference numerals refer to the like elements throughout. The embodiments are described below to explain the present invention by referring to the figures.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 is a construction view exemplifying an impedance matching system according to an exemplary embodiment of the present invention, which is applied to an antenna.

Referring to FIG. 1, the impedance matching system includes a directional coupler 10, a processing block 11, an amplitude comparing unit 40, a phase comparing unit 45, a coefficient calculator 50, a circuit controller 55, and a matching circuit 60 according to an aspect of the present invention.

The directional coupler 10 is disposed on a line, which connects an antenna 1 and a transmitting and receiving circuit unit (not shown). The directional coupler 10 extracts an output signal, which is an electric current outputted to the antenna 1, and an input signal, which is an electric current inputted to the antenna 1, with a predetermined ratio. At this time, an extracting rateratio of the output signal is the same as that of the input signal. A relative amplitude difference between the output signal and the input signal is large. That is, the output signal or the input signal can has an amplitude larger than the input signal or the output signal according to whether the transmitting circuit is operated or the receiving circuit is operated.

For instance, if a transmitting circuit is operated, the directional coupler 10 extracts an output signal outputted through the antenna 1 and an input signal reflected from the antenna 1 and returned to the transmitted circuit with a predetermined ratio. In this case, amplitude of the output signal is larger than that of the input signal. If a receiving circuit is operated, the directional coupler 10 extracts an input signal inputted through the antenna 1 and an output signal reflected from the receiving circuit with a predetermined ratio. In this case, amplitude of the input signal is larger than that of the output signal.

On the other hand, when the transmitting circuit is operated, the output and the input signals extracted through directional coupler 10 can be represented as A cos $\omega_c t$ and A' cos $\omega_c t + \Delta\phi$, respectively. Here, A and A' are amplitudes of the output and the input signals, respectively, $\omega_c (=2\pi f_c)$ is a receiving frequency and $\Delta\phi$ is a phase difference between the output signal and the input signal.

The processing block 11 processes the output and the input signals extracted from the directional coupler 10 to make the output and the input signals into a condition capable of comparing phases and amplitudes with each other. The processing block 11 includes a local oscillator 20, a pair of mixers 15, a pair of band pass filters (BPF) 25, a pair of variable gain amplifiers (VGA) 30, and a pair of analogue-to-digital (A/D) converters 35.

The local oscillator 20 produces a local oscillation signal, which has a frequency $f_c + \Delta f$ or $f_c - \Delta f$ larger or smaller by a predetermined frequency bandwidth $\Delta f$ than a carrier wave frequency band $f_c$ of signals outputted or inputted to the antenna 1, and provides the local oscillation signal to the mixers 15. At this time, the local oscillation signal produced at the local oscillator 20 can be represented as $\cos(\omega_c + \Delta\omega)t$.

The local oscillator 20 can use a conventional local oscillator, which is installed in the transmitting and receiving circuit unit. In this case, there is a need of separate elements capable of adjusting the frequency of the local oscillation signal outputted from the local oscillator.

The pair of mixers 15 multiplies the output and the input signals extracted at the directional coupler 10 by the local oscillation signal provided from the local oscillator 20. Then, frequencies of the output and the input signals outputted from the mixers 15 do not go down to a base band, but to a predetermined frequency band. In the mixer 15 to which the output signal is inputted, the output signal is multiplied by the local oscillation signal, so that a signal, which can be represented as $$\frac{A}{2}[\cos(2\omega_c t + \Delta\omega t) + \cos\Delta\omega t],$$

is outputted, whereas in the mixer 15 to which the input signal is inputted, the input signal is multiplied by the local oscillation signal, so that a signal, which can be represented as $$\frac{A'}{2}[\cos(2\omega_c t + \Delta\omega t + \Delta\phi) + \cos(\Delta\omega t - \Delta\phi)],$$

is outputted.

If the frequencies of the output and the input signals outputted from the mixers 15 go down to the base band, it is impossible to compare phases of the output and the input signals with each other. Accordingly, it is important that the frequencies of the output and the input signals do not go down to the base band at the mixers 15.

The pair of BPFs 25 filters the input and the output signals in which the frequencies are lowered to the predetermined frequency band, by a predetermined width on the basis of a center frequency $\Delta f$, respectively. After filtering, the BPF 25 to which the output signal is inputted outputs a signal, which can be represented as $$\frac{A}{2}\cos\Delta\omega t,$$

whereas the BPF 25 to which the input signal is inputted outputs a signal, which can be represented as $$\frac{A'}{2}\cos(\Delta\omega t - \Delta\phi).$$

The pair of VGAs 30 is amplifiers, which can vary a gain by adjusting an amplification factor, and amplify the input and the output signals to magnitudes, which are capable of comparing phases and amplitudes thereof with each other at the phase comparing unit 45 and the amplitude comparing unit 40, respectively. Accordingly, the amplification factors of the respective VGAs 30 are determined according to the magnitudes of the input and the output signals. For instance, if the magnitudes of the input and the output signals are small, the amplification factors are enlarged, and if the magnitude of the input and the output signals are large, the amplification factors are lessened. And the amplification factors of the respective VGAs 30 are set to be identical to each other. The reason is that in order to detect a real amplitude difference between the input signal and the output signal, the input and the output signals should be amplified with the same amplification factor.

The pair of A/D converters 35 converts the amplified input and the amplified output signals from the respective VGAs 30 into digitized input and digital output signals.

The amplitude comparing unit 40 compares an amplitudes of the digitized output signal with an amplitude of the digitized input signal, and calculate a ratio of amplitudes A and A' of the digitized input and the digital output signals.

The phase comparing unit 45 compares a phase of the digitized output signal with a phase of the digitized input signal, and calculate a phase difference $\Delta\phi$ between the digitized input signal and the digitized output signal.

On the other hand, the coefficient calculator 50 calculates a reflection coefficient using the rateratio of amplitudes A and A' of, and the phase difference $\Delta\phi$ between the digital input and the digital output signals calculated at the amplitude comparing unit 40 and the phase comparing unit 45, respectively. Generally, the reflection coefficient is represented as $$\frac{A}{A'} = e^{-j\Delta\phi}.$$

Accordingly, if the ratio of amplitudes A and A' calculated at the amplitude comparing unit 40 and the phase difference $\Delta\phi$ calculated at the phase comparing unit 45 are substituted for the above reflection coefficient formula, the reflection coefficient can be obtained.

The circuit controller 55 produces a control signal for controlling the matching circuit 60 according to the reflection coefficient calculated at the coefficient calculator 50.

The matching circuit 60 is generally made up of elements including an inductor, a capacitor (or a condenser), etc. The capacitor is formed of a varactor in which a capacitance is varied according to a voltage. Accordingly, when a voltage, which is applied to the matching circuit 60, is varied, an inductance of the inductor and a capacitance of the capacitor are varied.

Thus, the circuit controller 55 determines a value of voltage applied to the inductor and the capacitor, and outputs a control signal to the matching circuit 60. At this time, the circuit controller 55 determines the value of voltage, so that the reflection coefficient comes to 0. When the reflection coefficient comes to 0, an impedance of the antenna 1 becomes 50Ω, which is a predetermined value of intrinsic impedance.

The circuit controller 55 can determine a value of voltage applied to the matching circuit 60 using a lookup table 65. That is, the lookup table 65 is first formed on the basis of a plurality of values of voltage to be applied to the matching circuit, which are predetermined according to a plurality of coefficients of reflection. And then, when a reflection coefficient is calculated at the coefficient calculator 50, the circuit controller 55 reads a corresponding value of voltage from the lookup table and outputs a control signal to the matching circuit 60.

Figure 2:
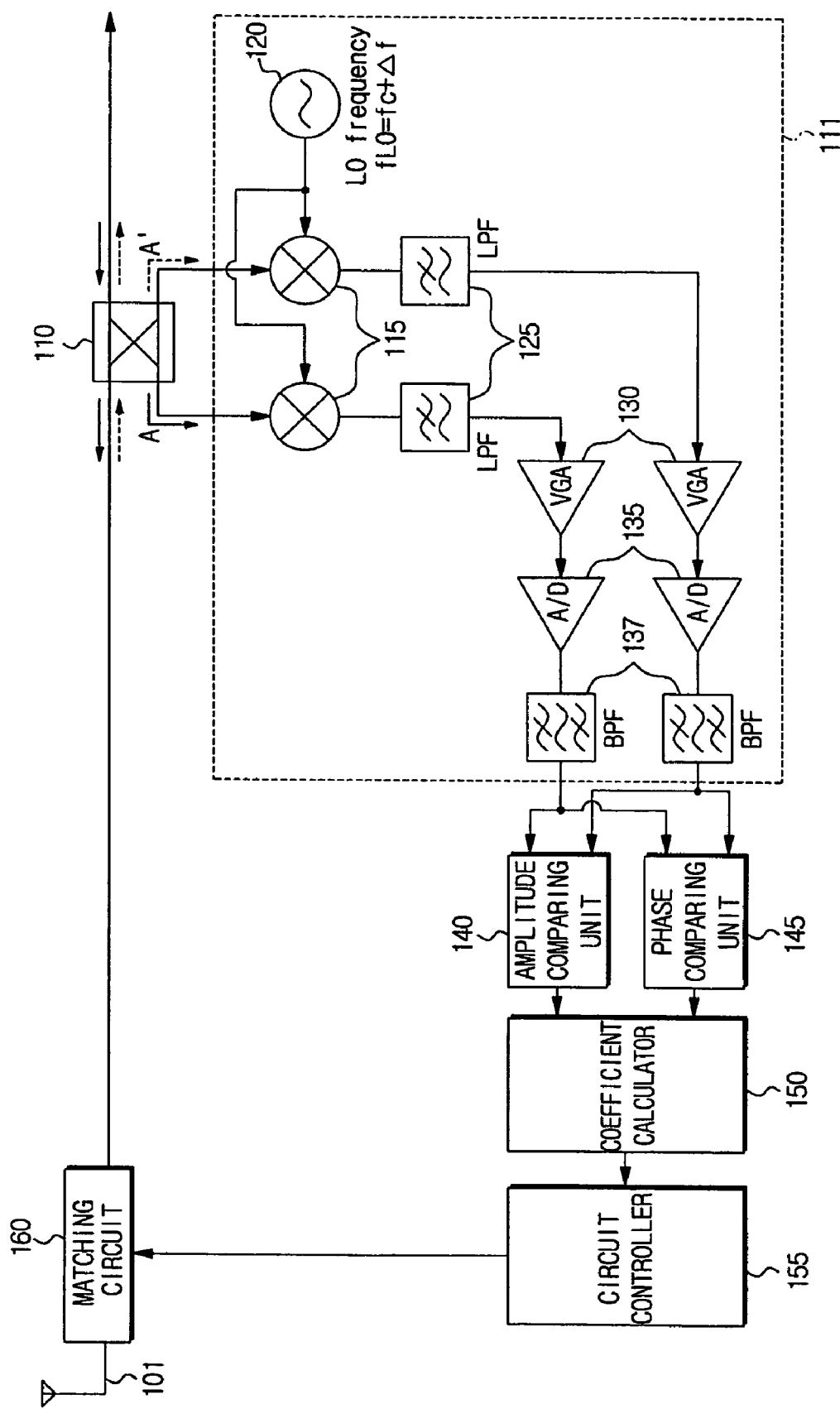
FIG. 2 is a construction view exemplifying an impedance matching system according to an exemplary embodiment of the present invention, which is applied to an antenna.

FIG. 2 is a construction view exemplifying an impedance matching system according to an exemplary embodiment of the present invention, which is applied to an antenna 101.

The impedance matching system of the exemplary embodiment described in FIG. 2 has almost the same construction as that of the impedance matching system of the exemplary embodiment described FIG. 1 in that it includes a directional coupler 110, a processing block 111, an amplitude comparing unit 140, a phase comparing unit 145, a coefficient calculator 150, a circuit controller 155, and a matching circuit 160. However, the structure of the processing block 111 is a little different from that of the processing block 11 of the impedance matching system of the exemplary embodiment of the present invention described in FIG. 1.

The processing block 111 includes a pair of mixers 115, a local oscillator 120, a pair of LPFs (Low Pass Filter) 125, a pair of VGAs (Variable Gain Amplifier) 130, a pair of A/D (Analog to Digital) converters 135, and a pair of BPFs (Band Pass Filter) 137.

Each of the mixers 115 receives a local oscillation signal of predetermined frequency bandwidth from the local oscillator 120, and multiples output signal from the directional coupler 110 and input signals inputted by the local oscillation signal from the local oscillator 120 to go down frequencies thereof to a predetermined frequency band.

The pair of LPFs 125 filters signals the predetermined frequency on the basis of the predetermined frequency, from having signals inputted by the mixer 115 in which the frequencies are lowered to the predetermined frequency band at the mixers 115, respectively.

Each of the VGAs 130 amplifies the input and the output signals inputted by LPFs 125, and each of the A/D converters 135 digitizes the input and the output signals inputted by A/D converters 135 to output digitized input and output signals.

The pair of BPFs 137 filters the digitized input and output signals inputted from A/D converters 135 on the basis of the predetermined frequency band, respectively.

That is, in the exemplary embodiment of FIG. 1, the output and the input signals outputted from the mixers 15 are filtered once by the BPFs (Band Pass Filter) 25, respectively, whereas in the exemplary embodiment of the present invention in FIG. 2, the output and the input signals outputted from the mixers 115 are first filtered by the LPFs (Low Pass Filter) 125 outputted to the VGAs 130 amplifies the inputted signals from LPFs 125 outputs to the A/D converters 135, and then secondly filtered by the BPFs 137, respectively. The matching system of the exemplary embodiment of the present invention in FIG. 2 digitizes a portion of a procedure of processing the output and the input signals, thereby ensuring the output and the input signals to be more precisely filtered.

Figure 3:
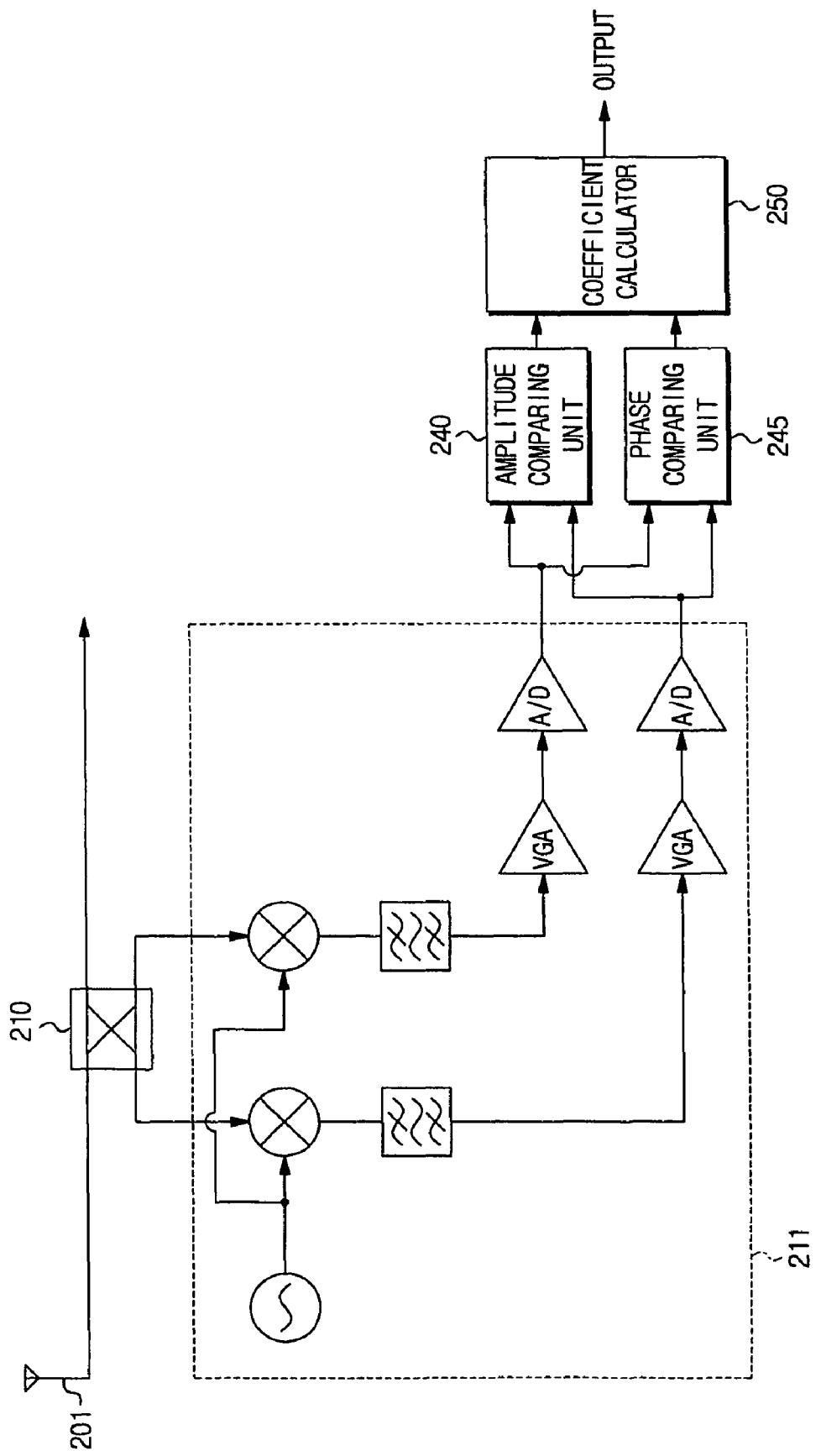
FIG. 3 is a construction view exemplifying a network analyzer according to an exemplary embodiment of the present invention.

FIG. 3 is a construction view exemplifying a network analyzer according to an exemplary embodiment of the present invention.

The network analyzer of the exemplary embodiment of the present invention in FIG. 3 includes a directional coupler 210, a processing block 211, an amplitude comparing unit 240, a phase comparing unit 245, and a coefficient calculator 250. The network analyzer is formed on a single board, and directly mounted to an antenna 201.

The directional coupler 210 extracts input and output signals from the antenna 201. The processing block 211 processes the input and the output signals. And the coefficient calculator 250 calculates a reflection coefficient according to the results calculated at the amplitude comparing unit 240 and the phase comparing unit 245. Here, it should be noted that the processing block 211 could be configured according to either an exemplary embodiment of the present invention in FIG. 1 or another exemplary embodiment of the present invention in FIG. 2. In FIG. 3, there is illustrated the network analyzer to which the processing block according to the exemplary embodiment in FIG. 1 is applied.

Generally, a conventional network analyzer, which is used for measuring a reflection coefficient of an antenna, is connected to an antenna through a cable. During use of the conventional network analyzer, however, the reflection coefficient of the antenna is influenced by the cable, and thereby a reflection coefficient of both the antenna and the cable is measured. Accordingly, it is difficult to accurately measure only the reflection coefficient of the antenna. Particularly, in a small size antenna, it is more difficult to accurately measure only the reflection coefficient of the antenna.

However, since the network analyzer of the exemplary embodiment of the present invention in FIG. 3 is directly mounted to the antenna 201, there is no possibility that during use of the network analyzer, the reflection coefficient of the antenna is influenced by the cable. Accordingly, the reflection coefficient of the antenna can be accurately measured, and in the small size antenna, the utility of the network analyzer is more enlarged.

Figure 4:
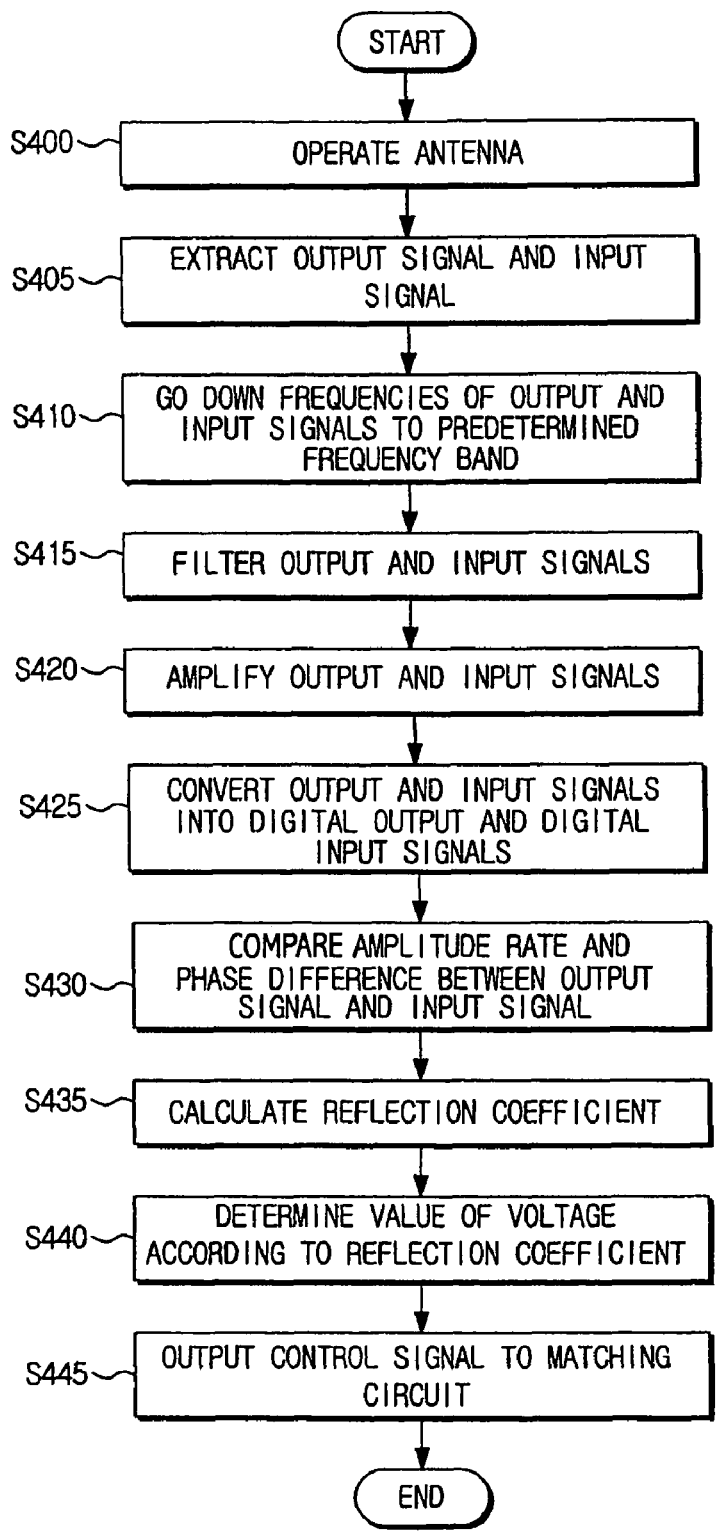
FIG. 4 is a flow chart exemplifying an impedance matching method of the impedance matching system according to the embodiment of the present invention illustrated FIG. 1.

Hereinafter, an impedance matching process of the impedance system according to the exemplary embodiment of the present invention in FIG. 1 constructed as described above will now be described with reference to FIG. 4.

When the antenna 1 is operated (S400), the directional coupler 10 produces an output signal and an input signal extracting an electric current transmitted to the transmitting and receiving circuit unit from the antenna 1 and an electric current transmitted to the antenna 1 from the transmitting and receiving circuit unit (not shown) with a predetermined ratio, respectively (S405).

The extracted output and the extracted input signals are transmitted to the mixers 15 to go down frequencies thereof to a predetermined frequency band (S410), and then filtered centering on the predetermined frequency band at the BPFs 25, respectively (S415). The filtered output and the filtered input signals are amplified with the same amplification factor at the VGAs 30 (S420), and then converted into digitalized output and digitalized input signals at the A/D converters 35, respectively (S425).

The digitized output and the digitized input signals are transmitted to the amplitude comparing unit 40 and the phase comparing unit 45. The amplitude comparing unit 40 compares an amplitude rate between the output signal and the input signal using the digitized output and the digitized input signals. At this time, if the transmitting circuit is operated, the amplitude comparing unit 40 compares an amplitude rate of the output signal/the input signal, and if the receiving circuit is operated, the amplitude comparing unit 40 compares an amplitude rate of the input signal/the output signal. The phase comparing unit 45 compares a phase between the digitized output signal and the digitized input signal, and compares a phase difference between the output signal and the input signal (S430).

The amplitude rate and the phase difference compared at the amplitude comparing unit 40 and the phase comparing unit 45 are outputted to the coefficient calculator 50. The coefficient calculator 50 calculates a reflection coefficient using the amplitude rate and the phase difference (S435).

The circuit controller 55 determines a voltage to be applied to the inductor and the capacitor of the matching circuit 60, so that the reflection coefficient comes to 0 (S440), and outputs a control signal to the matching circuit 60 (S445). As a result, the voltage, which is applied to the inductor and the capacitor of the matching circuit 60, is changed, and an impedance is matched.

As described above, according to the exemplary embodiments of the present invention, the impedance matching system calculates the reflection coefficient comparing the phases and the amplitudes of the output and the input signals, so that the value of voltage to be provided to the matching circuit is determined through a single matching procedure. Accordingly, the impedance matching system according to the exemplary embodiments of the present invention can instantly control the matching circuit to quickly carry out the impedance matching procedure. That is, the impedance matching system according to the exemplary embodiments of the present invention can match the impedance of the antenna 1 coping in real time with impedance changes by external influences, such as a temperature, a humidity, other devices, etc., so that it can improve an electric power transmitting and receiving efficiency of the antenna 1 to the maximum.

Particularly, if the antenna 1 is minimized or built-in, since it is much affected by the external environment, the effect of the impedance matching system according to the exemplary embodiments of the present invention is more enlarged. Accordingly, even though the antenna 1 is minimized, the impedance matching system according to the exemplary embodiments of the present invention can easily carry out the impedance matching procedure, so that it can go far toward minimizing the antenna.

Further, according to the exemplary embodiments of the present invention, the network analyzer measures the reflection coefficient with directly mounted to the antenna 1, thereby more easily and accurately measuring the reflection coefficient.

Although in the exemplary embodiments of the present invention as described above, the impedance matching system is illustrated and explained as the impedance matching system applied to the antenna 1, the present invention is not limited to that. For example, the impedance matching system according to the exemplary embodiments of the present invention is applicable to a radio frequency (RF) part or a RF circuit, besides the antenna 1.

As apparent from the foregoing description, according to the exemplary embodiments of the present invention, the impedance matching system, the network analyzer having the same, and the impedance matching thereof more easily and accurately measure the reflection coefficient, thereby allowing the load, such as the antenna, to be quickly and accurately impedance-matched. Thus, the system can go far toward minimizing the antenna.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An impedance matching system comprising:
   a signal extractor to extract an output signal and an input signal having at least a
   portion of an electric current outputted through a load and at least a portion of an electric current inputted through the load, respectively;
   a processor to process the output signal and the input signal extracted from the signal extractor;
   a comparator to compare a phase and an amplitude of the output signal with a phase and an amplitude of the input signal, respectively;
   a coefficient calculator to calculate a reflection coefficient using the comparative result provided from the comparator; and
   a circuit controller to generate a signal for controlling a matching circuit, which matches the phase and the amplitude of the output signal with the phase and the amplitude of the input signal, respectively, so as to ensure the reflection coefficient to have a predetermined value,
   wherein the processor firstly filters the output signal and the input signal by low-pass filtering, and then secondly filters the output signal and the input signal by band-pass filtering.

2. The system of claim 1, wherein the signal extractor comprises a directional
   coupler to produce an output signal extracting an electric current outputted through the
   load with a predetermined ratio and to produce an input signal extracting an electric current reflected from the load with a predetermined ratio, during an operation of a transmitting circuit.

3. The system of claim 1, wherein the signal extractor comprises a directional
   coupler to produce an input signal extracting an electric current inputted through the
   load with a predetermined ratio and to produce an output signal extracting an electric current reflected from a receiving circuit with a predetermined ratio, during an operation of the receiving circuit.

4. The system of claim 1, wherein the processor comprises:
   a local oscillator to generate a component of frequency different by the predetermined frequency band as compared with a base band frequency and to provide the component of frequency to the mixers;
   a pair of mixer mix the output and the input signals with a predetermined frequency, respectively, and thus to lower frequencies of the output and the input signals to a predetermined frequency band;
   a pair of BPFs (Band Pass Filter) to filter signals centering on a predetermined frequency band;
   a pair of Gain Amplifier to adjust an amplification gain of the output and the input signals; and
   a pair of A/D converters to convert the output and the input signals into digital signals.

5. The system of claim 4, wherein each of the amplifiers comprises a variable gain
   amplifier (VGA) to adjust an amplification gain of the output and the input signals.

6. The system of claim 5, wherein the amplifiers amplify the output and the input
   signals with the same gain.

7. The system of claim 1, wherein the processor comprises:
   a local oscillator to generate a component of frequency different by the predetermined frequency band as compared with a base band frequency and to provide the component of frequency to the mixers;

a pair of mixer mix the output and the input signals with a predetermined frequency, respectively, and thus to lower frequencies of the output and the input signals to a predetermined frequency band;

a pair of LPFs (Low Pass Filter) to filter signals of above a predetermined frequency on the basis of the predetermined frequency, from the input and the output signals in which the frequencies are lowered to the predetermined frequency band at the mixers, respectively a pair of VGAs (Variable Gain Amplifier) to adjust an amplification gain of the output and the input signals;

a pair of A/D converters to convert the output and the input signals into digital signals; and a pair of BPFs (Band Pass Filter) to filter the digital output and the digital input signals on the basis of the predetermined frequency band, respectively.

8. The system of claim 1, wherein the comparator comprises:

an amplitude comparing unit to compare an amplitude of digitized output signal with an amplitude of digitized input signal and to calculate the amplitudes of the output and the input signals, respectively; and a phase comparing unit to compare a phase of digitized output signal with a phase of digitized input signal and to calculate a phase difference between the output signal and the input signal.

9. The system of claim 1, wherein the circuit controller to determine a value of voltage applied to variable elements among elements forming the matching circuit, according to the reflection coefficient calculated at the coefficient calculator.

10. The system of claim 9, wherein the circuit controller is to determine the value of voltage, so that the load has an impedance of 50Ω by the matching circuit.

11. A network analyzer comprising:

a signal extractor to extract an output signal and an input signal having at least a portion of an electric current outputted through a load and at least a portion of an electric current inputted through the load, respectively;

a processor to process the output signal and the input signal extracted from the signal extractor;

a comparator to compare a phase and an amplitude of the output signal with a phase and an amplitude of the input signal, respectively; and a coefficient calculator to calculate a reflection coefficient using the comparative result provided from the comparator, wherein the processor firstly filters the output signal and the input signal by low-pass filtering, and then secondly filters the output signal and the input signal by band-pass filtering.

12. The network analyzer of claim 11, wherein the signal extractor comprises a directional coupler to extract the output and the input signals with a predetermined ratio from the electric currents in respective directions.

13. The network analyzer of claim 11, wherein the processor comprises:

a local oscillator to generate a component of frequency different by the predetermined frequency band as compared with a base band frequency and to provide the component of frequency to the mixers;

a pair of mixer mix the output and the input signals with a predetermined frequency, respectively, and thus to lower frequencies of the output and the input signals to a predetermined frequency band;

a pair of filters to filter signals;

a pair of gain amplifier to adjust an amplification gain of the output and the input signals; and a pair of A/D converters to convert the output and the input signals into digital signals.

14. The network analyzer of claim 13, wherein each of the filters comprises a band pass filter (BPF) to filter signals centering on a predetermined frequency band.

15. The network analyzer of claim 13, wherein the pair of variable gain amplifiers (VGA) to amplify the output and the input signals with the same gain, the variable gain amplifier being configured to be able to vary an amplification gain.

16. The network analyzer of claim 11, wherein the processor comprises:

a local oscillator to generate a component of frequency different by the predetermined frequency band as compared with a base band frequency and to provide the component of frequency to the mixers;

a pair of mixer mix the output and the input signals with a predetermined frequency, respectively, and thus to lower frequencies of the output and the input signals to a predetermined frequency band;

a pair of LPFs (Low Pass Filter) to filter signals of above a predetermined frequency on the basis of the predetermined frequency, from the input and the output signals in which the frequencies are lowered to the predetermined frequency band at the mixers, respectively a pair of gain amplifiers to adjust an amplification gain of the output and the input signals;

a pair of A/D converters to convert the output and the input signals into digital signals; and a pair of BPFs (Band Pass Filter) to filter the digital output and the digital input signals on the basis of the predetermined frequency band, respectively.

17. The network analyzer of claim 14, wherein the pair of variable gain amplifiers (VGA) to amplify the output and the input signals with the same gain, the variable gain amplifier being configured to be able to vary an amplification gain.

18. The network analyzer of claim 11, wherein the comparator comprises an amplitude comparing unit to compare amplitudes of an output signal and an input signal with each other and to calculate the amplitudes of the output signal and the input signal, respectively; and a phase comparing unit to compare phases of output and input signals with each other and to calculate a phase difference between the output signal and the input signal.

19. An impedance matching method comprising:

extracting an output signal and an input signal having at least a portion of an electric current outputted through a load and at least a portion of an electric current inputted through the load, respectively;

processing the output signal and the input signal;

comparing a phase and an amplitude of the output signal with a phase and an amplitude of the input signal, respectively;

calculating a reflection coefficient using the compared result; and determining a value of voltage for providing to a matching circuit so as to ensure the reflection coefficient to have a predetermined value, wherein the processing further comprises firstly filters the output signal and the input signal by low-pass filtering, and then secondly filters the output signal and the input signal by band-pass filtering.

20. The method of claim 19, wherein the producing the output and the input signals
comprises producing an output signal extracting an electric current outputted through the
load from a transmitting circuit with a predetermined ratio and producing an input signal extracting an electric current reflected from the load with a predetermined ratio.

21. The method of claim 19, wherein the producing the output and the input signals
comprises producing an input signal extracting an electric current inputted through the
load at a receiving circuit with a predetermined ratio and producing an output signal extracting an electric current reflected from the receiving circuit with a predetermined ratio.

22. The method of claim 19, wherein the processing comprising:
mixing the output and the input signals with a predetermined frequency, respectively, to lower frequencies of the output and the input signals to a predetermined frequency band;
filtering the output and the input signals;
amplifying the output and the input signals with a predetermined gain; and
converting the output and the input signals into digital signals.

23. The method of claim 22, wherein the filtering the output and the input signals
comprises filtering signals by a predetermined bandwidth, which centers on a predetermined frequency band, by using band pass filters (BPF).

24. The method of claim 22, wherein the filtering the output and the input signals
comprises filtering signals of above a predetermined frequency band by using low pass filters (LPF).

25. The method of claim 19, further comprising amplifying the output and the input signals with predetermined gains.

26. The method of claim 25, wherein the predetermined gains are the same.

27. The method of claim 26, wherein the filtering comprising:
filtering the output and the input signals with low pass filters (LPF); and
filtering the output and the input signal with band pass filters (BPF).

28. The method of claim 19, wherein the comparing comprises calculating
an amplitude ratio between the output signal and the input signal; and
calculating a phase difference between the output signal and the input signal.

29. The method of claim 19, wherein the determining the value of voltage comprises
determining a value of voltage applied to variable elements among elements forming a matching circuit, according to the reflection coefficient.

30. The method of claim 29, wherein the determining the value of voltage comprises
determining the value of voltage applied to the variable elements among the elements forming the matching circuit, so that the load has an impedance of 50Ω.

* * * * *